United States Patent
Ahn

(10) Patent No.: US 12,024,071 B2
(45) Date of Patent: Jul. 2, 2024

(54) CONTROL METHOD FOR VEHICLE WITH MOVING CONSOLE SYSTEM

(71) Applicants: Hyundai Motor Company, Seoul (KR); Kia Corporation, Seoul (KR)

(72) Inventor: Gye Young Ahn, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 371 days.

(21) Appl. No.: 17/379,584

(22) Filed: Jul. 19, 2021

(65) Prior Publication Data

US 2022/0242278 A1 Aug. 4, 2022

(30) Foreign Application Priority Data

Jan. 29, 2021 (KR) .................. 10-2021-0013529

(51) Int. Cl.
| | |
|---|---|
| *B60N 2/14* | (2006.01) |
| *B60N 2/01* | (2006.01) |
| *B60N 2/04* | (2006.01) |
| *B60R 7/04* | (2006.01) |
| *B60R 11/00* | (2006.01) |

(52) U.S. Cl.
CPC ............... *B60N 2/143* (2013.01); *B60N 2/01* (2013.01); *B60N 2/04* (2013.01); *B60R 7/04* (2013.01); *B60R 2011/0007* (2013.01); *B60R 2011/0012* (2013.01); *B60R 2011/0084* (2013.01)

(58) Field of Classification Search
None
See application file for complete search history.

(56) References Cited

U.S. PATENT DOCUMENTS

| | | | | |
|---|---|---|---|---|
| 6,543,848 B1 * | 4/2003 | Suga | ...................... | B60N 2/245 |
| | | | | 297/344.24 |
| 10,946,802 B2 * | 3/2021 | Harris | ...................... | F16H 19/04 |
| 2015/0142246 A1 * | 5/2015 | Cuddihy | ................. | B60R 21/20 |
| | | | | 280/775 |
| 2015/0375638 A1 * | 12/2015 | Farooq | ...................... | B60N 2/06 |
| | | | | 296/65.18 |
| 2016/0152163 A1 * | 6/2016 | Strasdat | .................... | B60N 2/24 |
| | | | | 296/64 |
| 2017/0072772 A1 * | 3/2017 | Salter | ...................... | B60H 1/246 |
| 2017/0368964 A1 * | 12/2017 | Kim | .......................... | B60N 2/14 |
| 2018/0208090 A1 * | 7/2018 | Wolas | .................. | B60N 2/5692 |
| 2018/0304779 A1 * | 10/2018 | Fitzpatrick | ........... | B62D 31/003 |
| 2019/0291617 A1 * | 9/2019 | Schlierf | ................. | B60N 2/793 |

(Continued)

FOREIGN PATENT DOCUMENTS

| | | | | |
|---|---|---|---|---|
| DE | 102018202288 A1 * | 8/2019 | ............... | B60N 2/14 |
| KR | 10-1987006 B1 | 6/2019 | | |

(Continued)

*Primary Examiner* — Amelia Vorce
(74) *Attorney, Agent, or Firm* — MORGAN, LEWIS & BOCKIUS LLP

(57) ABSTRACT

In a control method for a vehicle with a moving console system, the control method may suitably change arrangement of seats and a console in the vehicle with the moving console system, wherein the console moves within a predetermined range on a vehicle body, and may discharges hot or cool air supplied from a vehicle air conditioning device to the vehicle indoor even when the console is moved from a reference state, for achieving convenient vehicle use for passengers.

20 Claims, 14 Drawing Sheets

(56) References Cited

U.S. PATENT DOCUMENTS

| | | | | |
|---|---|---|---|---|
| 2020/0114785 A1* | 4/2020 | Hagedorn | ................. | B60N 2/14 |
| 2020/0223329 A1* | 7/2020 | Dry | ........................ | B60N 2/062 |
| 2020/0406787 A1* | 12/2020 | Line | ........................ | B60N 2/01 |
| 2022/0134959 A1* | 5/2022 | Harmon | ................... | B60R 7/043 |
| | | | | 296/37.15 |
| 2022/0144142 A1* | 5/2022 | Kondrad | .............. | B60N 2/3047 |
| 2022/0227202 A1* | 7/2022 | Maier | ................ | B60H 1/00542 |

FOREIGN PATENT DOCUMENTS

| | | |
|---|---|---|
| KR | 10-1987030 B1 | 6/2019 |
| KR | 10-2020-0063280 A | 6/2020 |

* cited by examiner

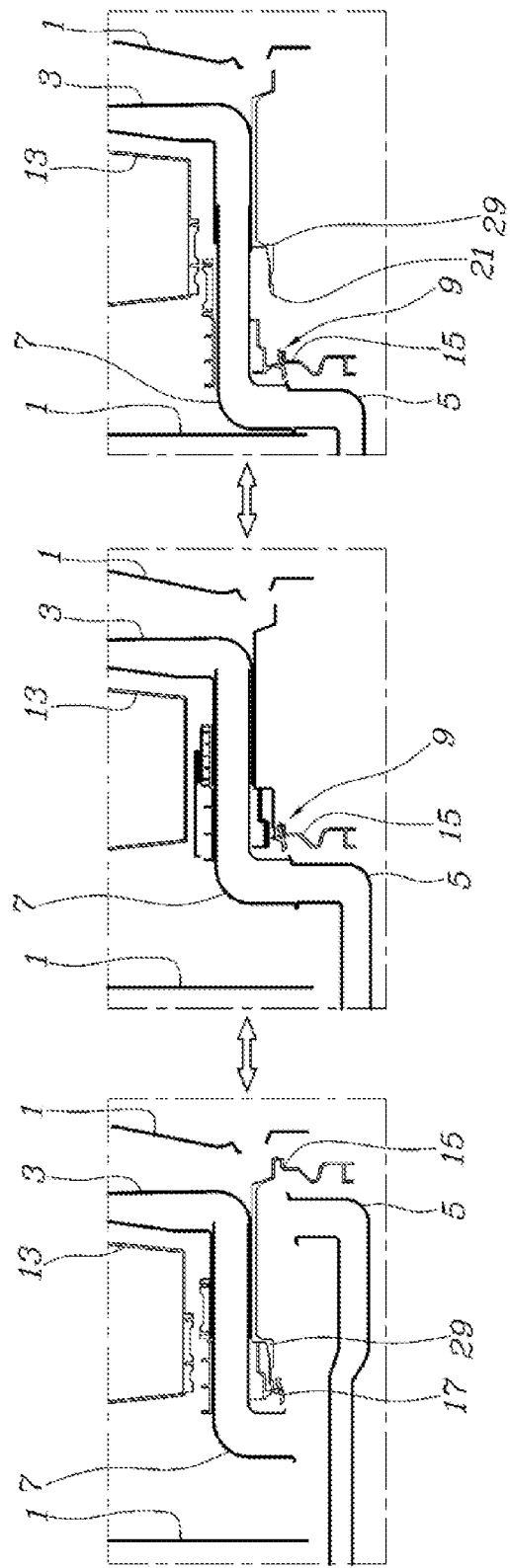

CONTROL METHOD FOR VEHICLE WITH MOVING CONSOLE SYSTEM

CROSS REFERENCE TO RELATED APPLICATION

The present application claims priority to Korean Patent Application No. 10-2021-0013529, filed Jan. 29, 2021, the entire contents of which is incorporated herein for all purposes by this reference.

BACKGROUND OF THE INVENTION

Field of the Invention

The present invention relates to a console mounted to a vehicle.

Description of Related Art

A console is provided in a vehicle with a space for storing objects therein, and conventionally, the console is fixed to a vehicle body.

In a future vehicle, a seat is not fixed to the vehicle body, but multiple seat variation may be required such that the seat may be moved backward, forward, left and right and may be swiveled.

Therefore, it is necessary that the console is not fixed to the vehicle body, but is movably mounted to the vehicle body to correspond to changes in seat position or posture.

Furthermore, when the console is provided to be movable relative to the vehicle body and configured to discharge hot or cool air supplied from an air conditioning device of the vehicle, vehicle indoor temperature control and air conditioning performance may be secured even when a vehicle where a B pillar is not provided and thus installation of an air conditioning vent is difficult.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a control method for a vehicle with a moving console system, wherein various exemplary embodiments of the present invention is configured to suitably change arrangement of seats and a console in the vehicle with the moving console system, the console being configured to move within a predetermined range on a vehicle body and discharging hot or cool air supplied from a vehicle air conditioning device to the vehicle indoor even when the console is moved from a reference state, achieving convenient vehicle use for passengers.

In various aspects of the present invention, there is provided a control method for a vehicle with a moving console system. The control method includes: when a function to change a reference seat state to a face-to-face seat state is started, (A1) disengaging first row seats and a housing of a movable console of the vehicle from each other in a longitudinal direction of a vehicle body in the vehicle; (A2) swiveling the first row seats to face second row seats of the vehicle; and (A3) performing at least one of moving the first row seats to a front of the vehicle body and moving the housing to a rear of the vehicle body.

In (A1), the housing may be moved to the front of the vehicle body, and the first row seats may be moved to the rear of the vehicle body.

In (A3), the housing may be moved to the rear of the vehicle bod by a distance in which the housing is moved forward in (A1); and the first row seats may be moved to the front of the vehicle body by a distance in which the first row seats is moved rearward in (A1).

In (A1), the housing may be moved to the front of the vehicle body, and in (A3), the housing may be moved to the rear of the vehicle body by a distance in which the housing is moved forward in (A1).

In (A1), the first row seats may be moved to the rear of the vehicle body, and in (A3), the first row seats may be moved to the front of the vehicle body by a distance in which the first row seats are moved rearward in (A1).

When (A1) is performed, a fixed duct in the moving console system may be closed; and when (A3) is completed, the fixed duct in the moving console system may be opened.

When (A1) is performed, the housing may be moved relatively forward from a reference state on the vehicle body; and when (A3) is performed, the housing may be returned to the reference state.

A control method for a vehicle with a moving console system includes: when an entering or exiting support function is started in a reference seat state, (B1) disengaging first row seats and a housing of a movable console of the vehicle from each other in a longitudinal direction of a vehicle body in the vehicle; (B2) swiveling a seat to perform the entering or exiting support function in the first row seats to be directed to an outside of the vehicle body; and (B3) when the entering or exiting support function is completed, performing at least one of moving the first row seats to a front of the vehicle body and moving the housing to a rear of the vehicle body.

In (B1), the housing may be moved to the front of the vehicle body, and the first row seats may be moved to the rear of the vehicle body.

In (B3), the housing may be moved to the rear of the vehicle body by a distance in which the housing is moved forward in (B1); and the first row seats may be moved to the front of the vehicle body by a distance in which the first row seats are moved rearward in (B1).

In (B1), the housing may be moved to the front of the vehicle body, and in (B3), the housing may be moved to the rear of the vehicle body by a distance in which the housing is moved forward in (B1).

In (B1), the first row seats may be moved to the rear of the vehicle body, and in (B3), the first row seats may be moved to the front of the vehicle body by a distance in which the first row seats are moved rearward in (B1).

When (B1) is performed, a fixed duct in the moving console system may be closed; and when (B3) is completed, the fixed duct in the moving console system may be opened.

When (B1) is performed, the housing may be moved relatively forward from a reference state on the vehicle body; and when (B3) is performed, the housing may be returned to the reference state.

When (B1) is performed, the seat to perform the entering or exiting support function in the first row seats may be moved to the rear of the vehicle body and the housing may be moved relatively forward from a reference state on the vehicle body.

When (B3) is performed, the seat to perform the entering or exiting support function may be moved forward and the housing may be returned to the reference state.

In (B2), the seat to perform the entering or exiting support function may be swiveled toward the outside of the vehicle body within a range of an acute angle from the front of the vehicle body.

The present invention is configured to control the moving console system and to move the seats, so that seat arrangement may be changed from the reference seat state in which passengers in a first row seat and a second row seat face the front of the vehicle to the face-to-face seat state in which the passengers in the first and second row seats face each other. Furthermore, the present invention is configured to discharge hot or cool air supplied from the air conditioning device to the vehicle indoor in both states of before and after seat arrangement change, so that the vehicle indoor temperature control and air conditioning performance may be easily and stably secured and the passengers can conveniently enter or exit the vehicle, maximizing the convenience of vehicle use.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 11A, FIG. 11B, and FIG. 11C are comparative views showing the moving console system in FIG. 1 with three states that the moving console system may implement;

Figure 1:
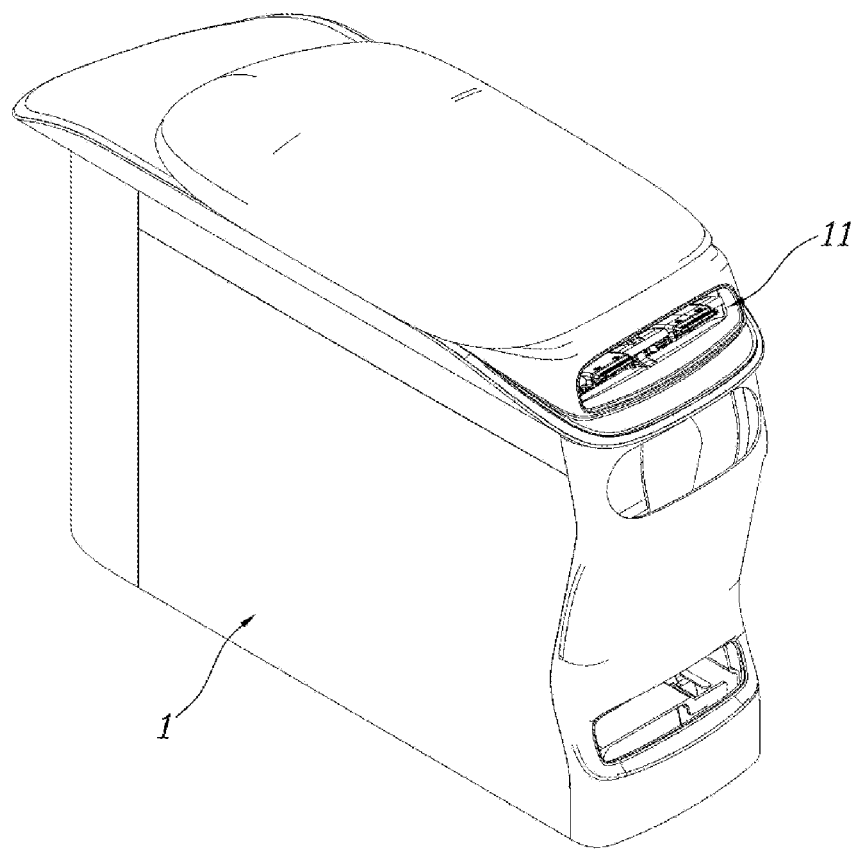
FIG. 1 is a view showing the exterior of a housing of a moving console system according to various exemplary embodiments of the present invention.
Figure 2:
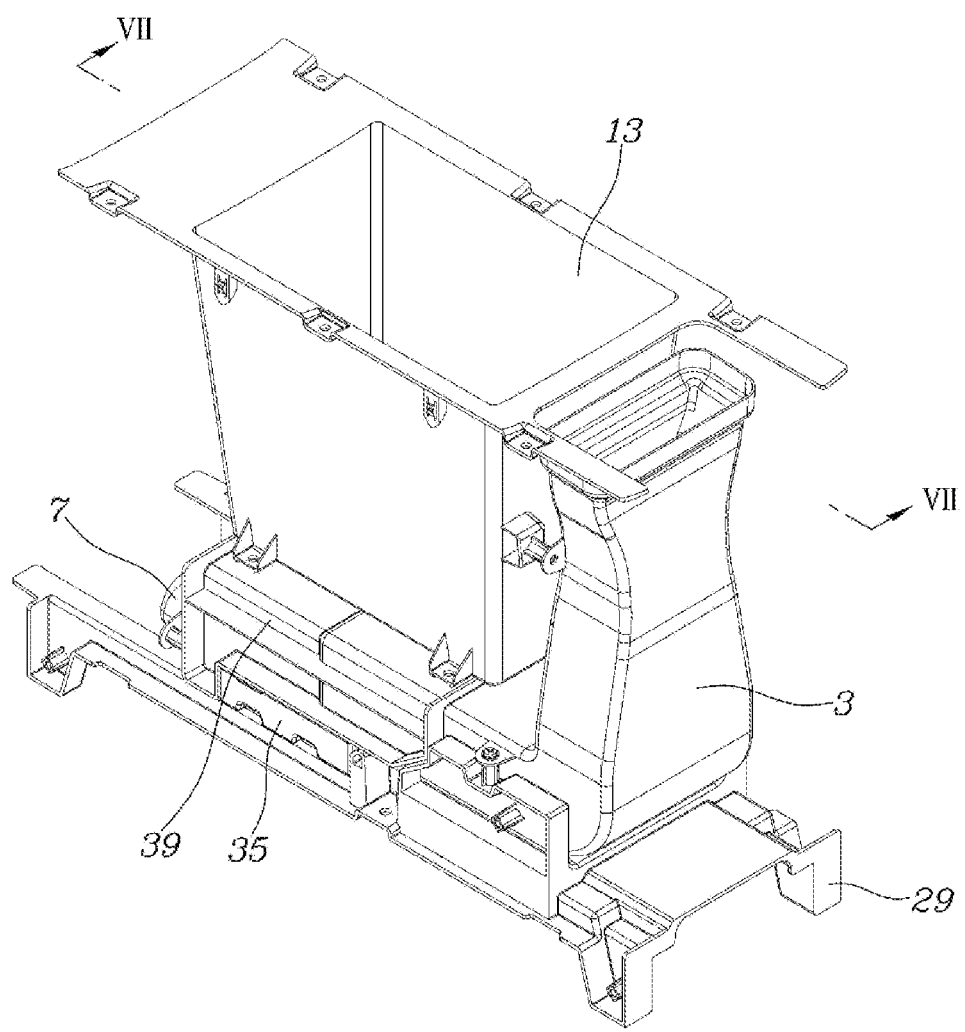
FIG. 2 is a view showing the interior of the moving console system in a state of removing the housing in FIG. 1.
Figure 3:
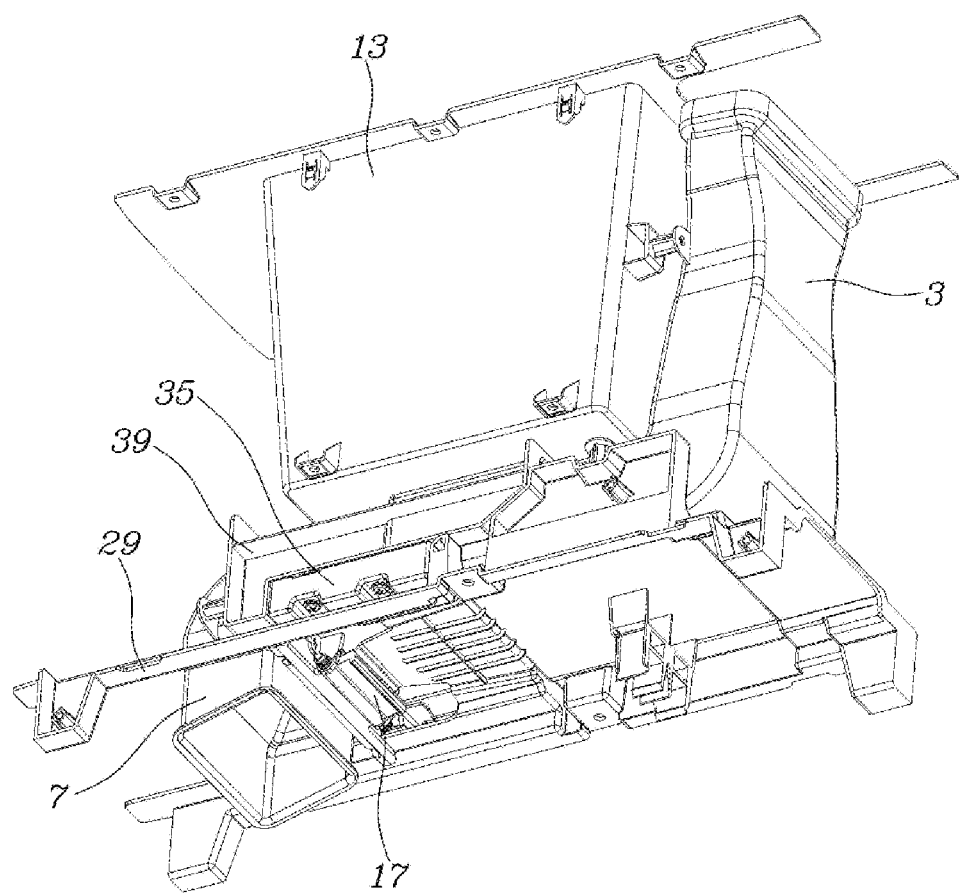
FIG. 3 is a view showing the configuration of the moving console system in FIG. 2 by being taken at a different angle from FIG. 2.
Figure 4:
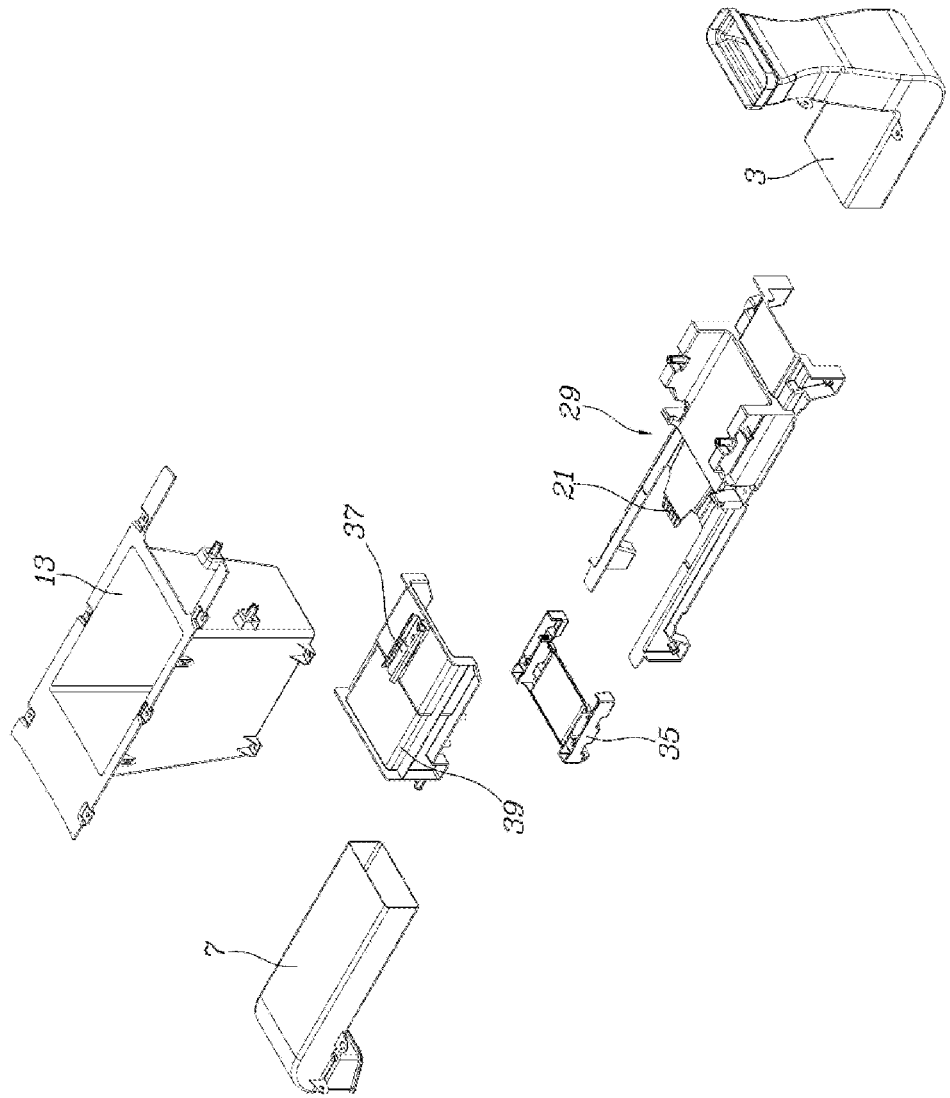
FIG. 4 is a disassembled perspective view showing the configuration of the moving console system in FIG. 2.
Figure 5:
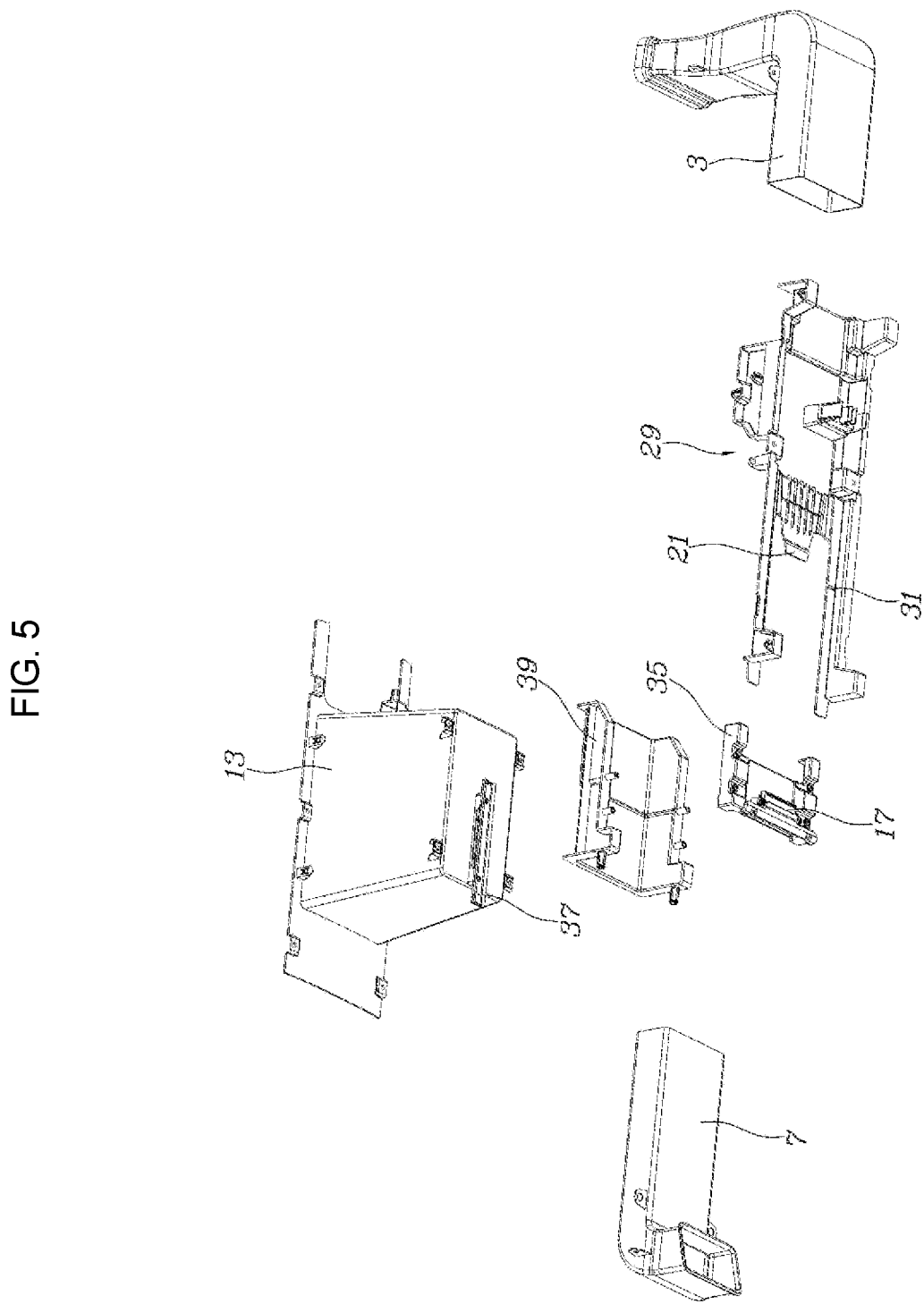
FIG. 5 is a view showing the configuration of the moving console system in FIG. 4 by being taken at a different angle from FIG. 4.
Figure 6:
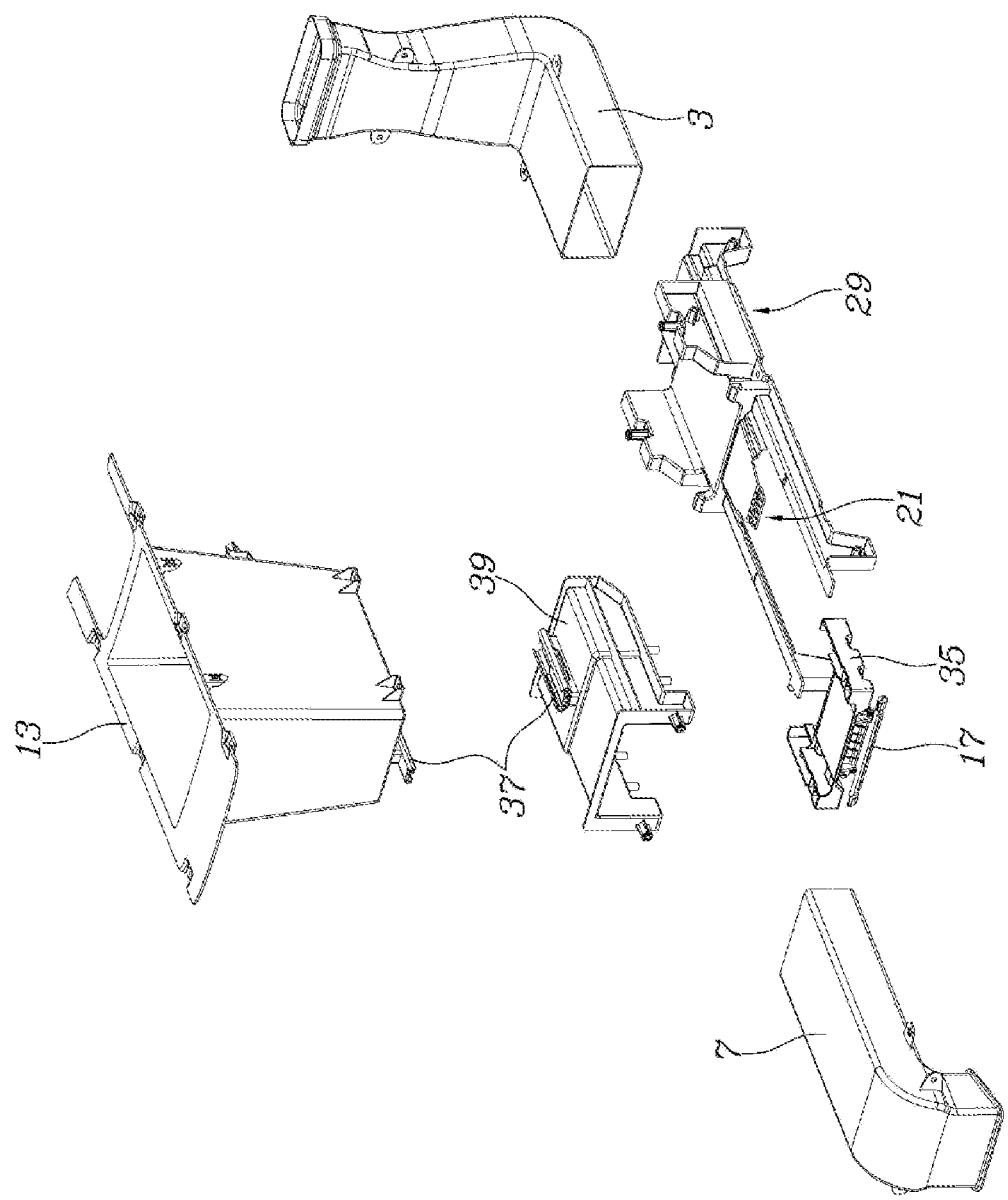
FIG. 6 is a view showing the configuration in FIG. 4 by being taken at a different angle from FIG. 4.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, the structural or functional description specified to exemplary embodiments according to the concept of the present invention is intended to describe the exemplary embodiments of the present invention, so it should be understood that the present invention may be variously embodied, without being limited to the exemplary embodiments.

Embodiments described herein may be changed in various ways and various shapes, so specific embodiments are shown in the drawings and will be described in detail in the exemplary embodiment of the present invention. However, it should be understood that the exemplary embodiments according to the concept of the present invention are not limited to the exemplary embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various elements, but these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" may be interpreted in the same manner as those described above.

The terminology used herein is for describing various exemplary embodiments only and is not intended to limit the present invention. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which various exemplary embodiments of the present invention belongs. It must be understood that the terms defined by the dictionary are identical with the meanings within the context of the related art, and they should not be ideally or excessively formally defined unless the context clearly dictates otherwise.

Hereinbelow, various exemplary embodiments of the present invention will be described in detail with reference to accompanying drawings. Like reference numerals provided in the drawings indicate like components.

Referring to FIG. 1, FIG. 2, FIG. 3, FIG. 4, FIG. 5, FIG. 6, FIG. 7, FIG. 8, FIG. 9, FIG. 10, FIG. 11A, FIG. 11B, FIG. 11C, FIG. 12A, FIG. 12B, and FIG. 12C, a moving console system of a vehicle according to various exemplary embodiments of the present invention may include a housing 1 configured to linearly slide to a vehicle body; a moving duct 3 disposed in the housing 1 and configured to linearly slide together with the housing 1; a connecting duct 7 configured to linearly slide with respect to the moving duct 3 and to supply air received from a fixed duct 5 fixed to the vehicle body to the moving duct 3; and a locking device 9 configured to lock or unlock the connecting duct 7 at a position where an entrance of the connecting duct 7 communicates with the fixed duct 5.

That is, the moving console system is configured such that the housing 1 of a movable console is provided to be linearly slidable relative to the vehicle body, so a position of the movable console may be easily changed. The movable console enables a seat position and a swiveling state of the vehicle to be variously changed, so that the vehicle has advantageous in securing diversity of seat variations. Furthermore, the console is configured such that the moving duct 3 may discharge hot or cool air supplied from the fixed duct 5 through the connecting duct 7 into the vehicle room while the housing 1 of the console is moved, so temperature control and air conditioning performance of the vehicle may be efficiently satisfied.

Therefore, the moving console system of the present invention may be used in a future vehicle in which hot or cool air supply through a B pillar is not available since the B pillar is eliminated to efficiently secure the temperature control and air conditioning performance of the vehicle.

The housing 1 includes a vent 11 discharging hot or cool air supplied through the moving duct 3 and a storage box 13 configured for storing objects therein by opening a cover at the upper side of the housing.

As an example, in the moving console system of the exemplary embodiment of the present invention, the housing 1 is described on the premise that the housing 1 is configured to linearly slide in forward and rearward directions with respect to the vehicle body, but the direction of linear sliding may be variously changed depending on the situation.

The fixed duct 5 is fixed to the floor of the vehicle body and includes an outlet. The outlet of the fixed duct 5 is open upward so that hot or cool air supplied from air conditioning devices such as an air conditioner, a heater, or the like positioned in the front of the vehicle may be supplied toward the entrance of the connecting duct 7 through the outlet of the fixed duct 5.

The moving duct 3 has a straight section which is configured to overlap with the connecting duct 7 while being fitted over the outside of the connecting duct 7. Whereby, even when the moving duct 3 linearly slides in a direction away from the connecting duct 7, fluidical communication between the moving duct 3 and the connecting duct 7 may be continuously maintained.

In the exemplary embodiment of the present invention, the direction in which the moving duct 3 is away from the connecting duct 7 may be understood as the rear of the vehicle body.

As an example, in FIG. 11A, FIG. 11B, and FIG. 11C, three states that the moving console system of the present invention may implement are compared with states shown in FIG. 11A, FIG. 11B, and FIG. 11C. When FIG. 11B shows the reference state, FIG. 11A represents a state in which the moving duct 3 is moved forward relative to the vehicle body, and FIG. 11C represents a state in which the moving duct 3 is moved rearward relative to the vehicle body.

The locking device 9 includes: a stopper 15 fixed to the vehicle body; a locking lever 17 configured to be rotatable about a shaft fixed to the connecting duct 7 and of which a locked state to the stopper 15 is varied in a response to the rotation angle; and a locking spring 19 configured to apply elastic force in a direction in which the locking lever 17 is locked to the stopper 15.

That is, as the locking device 9 is configured such that the locking lever 17 is locked to the stopper 15 by the elastic force of the locking spring 19, the connecting duct 7 may be locked to the stopper 15 and stably maintain the reference state shown in FIG. 11B without being moved forward or rearward relative to the vehicle body.

When the moving duct 3 and the storage box 13 are moved rearward relative to the vehicle body and the state is turned from the reference state to the state shown in FIG. 11C, the locking device 9 allows the connecting duct 7 to be maintained in the stable locked state by the stopper 15 without being moved rearward together with the moving duct 3 and the storage box 13. Accordingly, the state of the connecting duct 7 communicating with the fixed duct 5 may be stably secured.

Therefore, even in state shown in FIG. 11C, the hot or cool air supplied through the fixed duct 5 may be discharged to the vent 11 through the connecting duct 7 and the moving duct 3.

The locking device 9 includes a locking release portion 21 fixed to the moving duct 3. The locking release portion is provided to release the locked state of the locking lever 17 as the moving duct 3 linearly slides in a direction closer to the connecting duct 7.

That is, when the moving duct 3 is moved from state shown in FIG. 11B to state shown in FIG. 11A, the locking release portion 21 may allow the locking lever 17 to be released from the locked state thereof.

However, the locking release portion 21 is not configured to release the locked state of the locking lever 17 while the moving duct 3 is moved from state shown in FIG. 11C to state shown in FIG. 11B.

That is, while the moving duct 3 is moved from state shown in FIG. 11C to state shown in FIG. 11B, the locking lever 17 should maintain the securely locked state to the stopper 15. Alternately, to move the moving duct 3 from state shown in FIG. 11B to state shown in FIG. 11A, the moving duct 3 should be moved together with the connecting duct 7. Therefore, the locking release portion 21 releases the locked state of the locking lever 17 so that the connecting duct 7 may be disconnected from the stopper 15 and slide forward thereof.

In the moving console system, the stopper 15 is positioned below the connecting duct 7; the locking release portion 21 is configured to enter a gap between an upper end portion of the stopper 15 and the connecting duct 7 by linearly sliding; and the locking lever 17 is positioned below the connecting duct 7 so that the shaft of the locking lever 17 is positioned below a linear sliding trajectory of the locking release portion 21.

The locking lever 17 includes: a hook arm 23 configured to be locked to the stopper 15 by the elastic force of the locking spring 19; and a release arm 25 integrally formed with the hook arm 23 to be rotated by the locking release portion 21 to release the hook arm 23 from the stopper 15.

Figure 7:
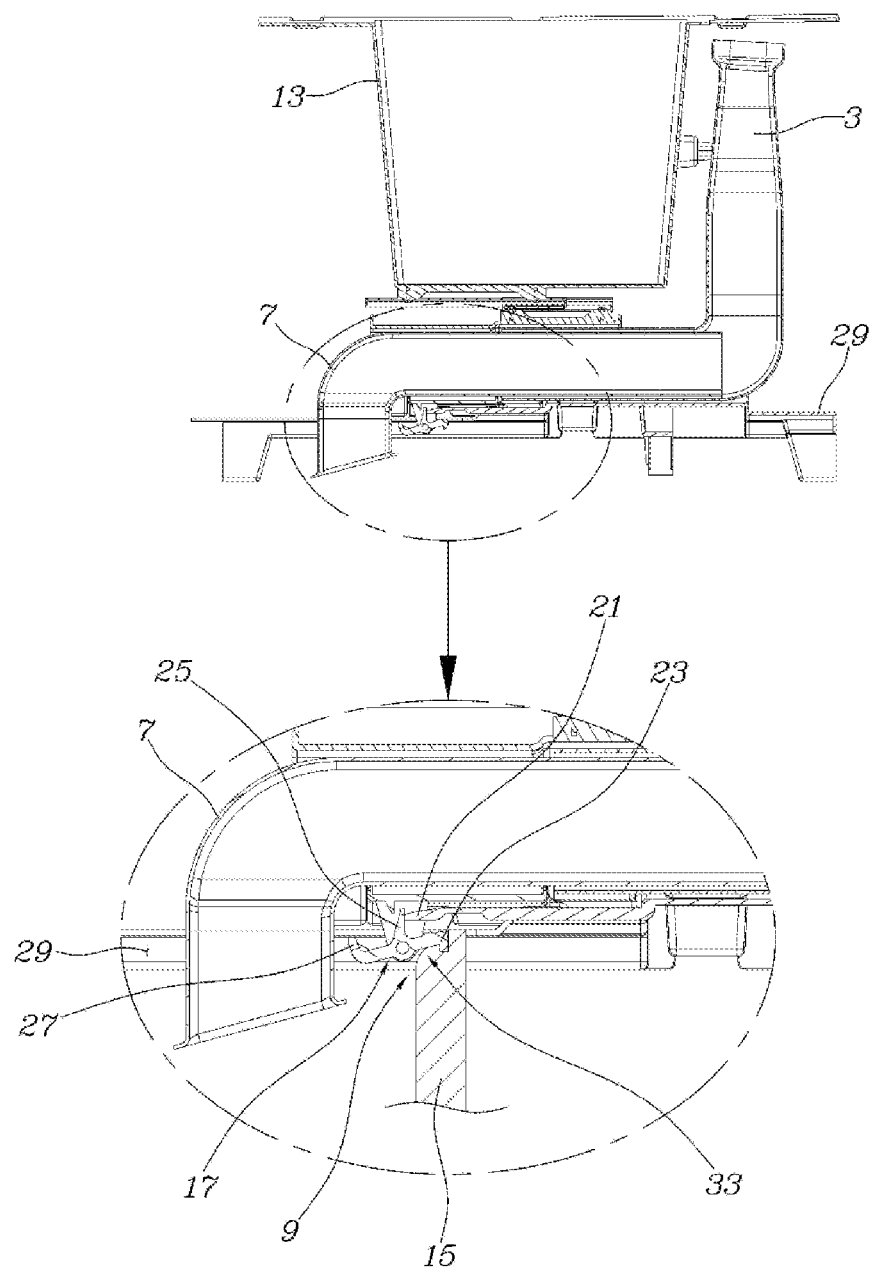
FIG. 7 is a sectional view taken along line VII-VII in FIG. 2.
Figure 8:
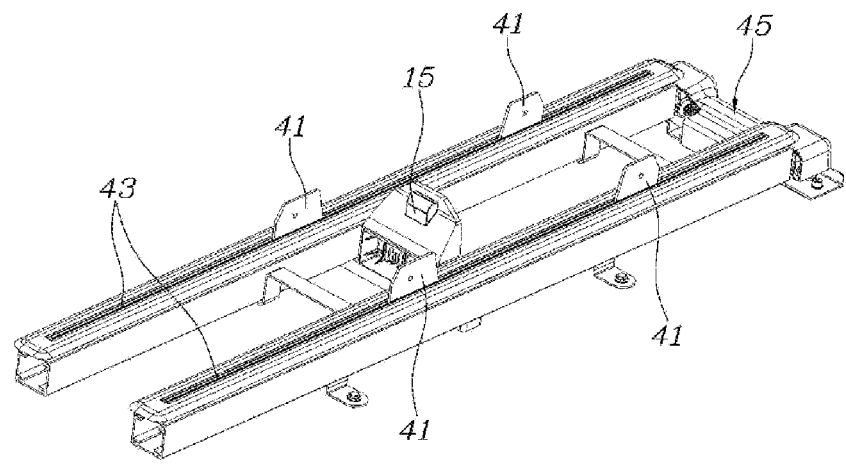
FIG. 8 is a view showing a slider and guide rails where the housing in FIG. 1 is coupled to the upper side of the slider and the guide rails to slide.
Figure 9:
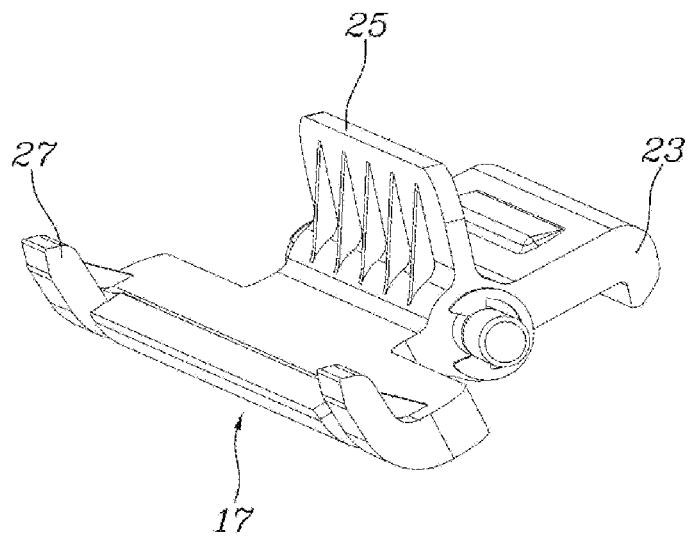
FIG. 9 is a view showing a locking lever in detail used in the moving console system in FIG. 1.
Figure 10:
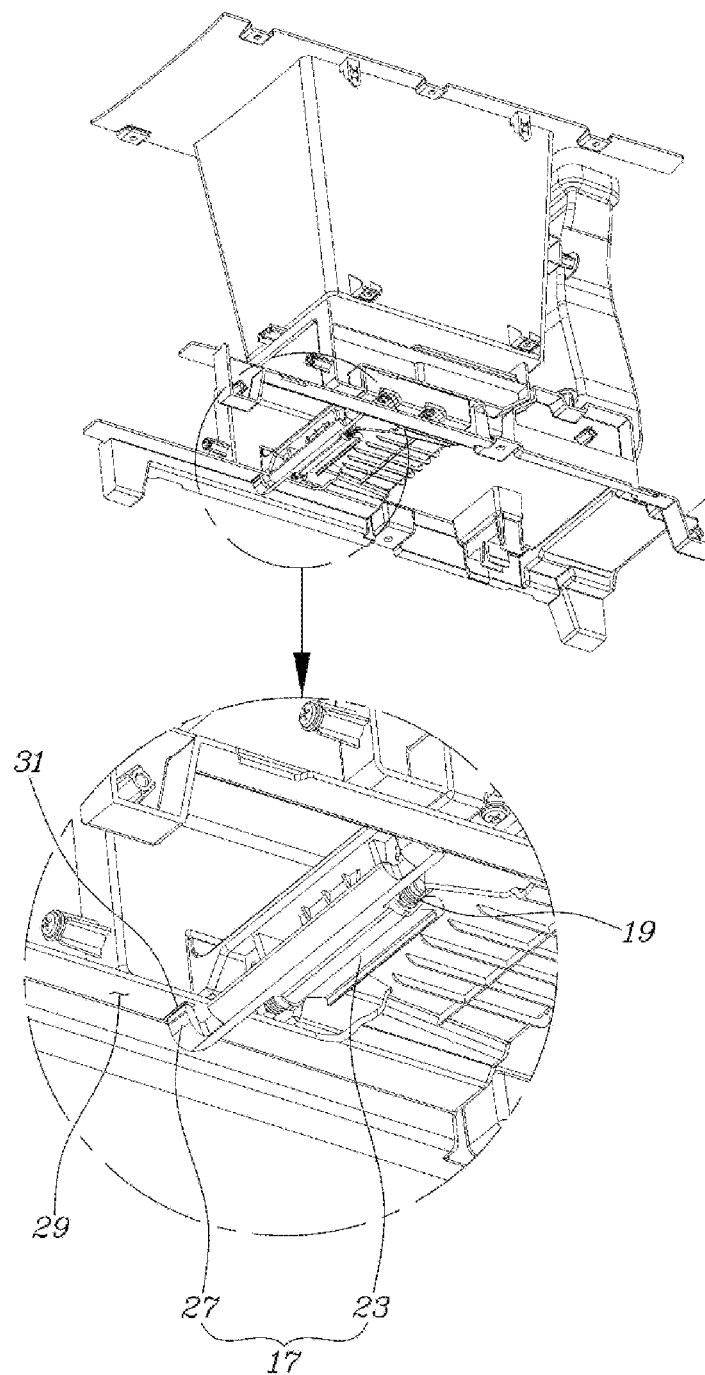
FIG. 10 is a view showing a restraining arm of the locking lever and a restraining hole of a lower plate that are used in the moving console system in FIG. 1.

FIG. 7 shows the locking lever 17, the stopper 15, and the locking release portion 21 in the reference state. Referring to FIG. 7, since a position in which the locking release portion 21 be brought into contact with the release arm 25 of the locking lever 17 is positioned above the shaft of the locking lever 17, when the locking release portion 21 is moved to the left side in the drawing, that is, is moved forward relative to the vehicle body, the release arm 25 of the locking lever 17 is rotated counterclockwise so that the hook arm 23 is released from the stopper 15.

Meanwhile, when the locking device 9 is released, the connecting duct 7 may be separated from the stopper 15 and be freely moved forward relative to the vehicle body. The connecting duct 7 is separated from the fixed duct 5 by the movement of the connecting duct 7, as shown in state shown in FIG. 11A.

In the above state, a restraining device is provided for restraining relative sliding of the connecting duct 7 and the moving duct 3, so that the connecting duct 7 is moved together with the moving duct when the moving duct 3 moved rearward is returned to the reference state.

The restraining device may be separately provided, but may be configured to be operated in conjunction with the locking device 9, causing a desirable result of reducing the number of parts.

In the moving console system, the restraining device is implemented with the locking device 9 and configured to be operated in conjunction with each other.

That is, the locking lever 17 includes a restraining arm 27. The restraining arm 27 is configured to restrain the relative sliding of the connecting duct 7 and the moving duct 3 by the elastic force of the locking spring 19 when the hook arm 23 of the locking lever 17 is separated from the stopper 15.

Furthermore, the locking release portion 21 is provided on a lower plate 29 fixed to a lower side of the moving duct 3; and the lower plate 29 has a restraining hole 31 into which the restraining arm 27 of the locking lever 17 is inserted to restrain the moving duct 3 to the connecting duct 7.

Figures 12A, 12B, 12C:
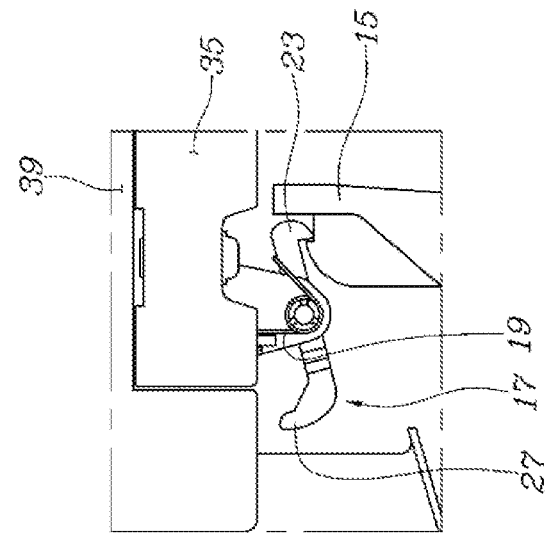
FIG. 12A, FIG. 12B, and FIG. 12C are views showing behavior or the locking lever in a response to movement of a moving duct of the moving console system in FIG. 1.

Therefore, in the state shown in FIG. 11A, the restraining arm 27 of the locking lever 17 is inserted into the restraining hole 31 of the lower plate 29 by the elastic force of the locking spring 19 so that the moving duct 3 and the connecting duct 7 are restrained each other as shown state shown in FIG. 12A. Whereby when the moving duct 3 is moved rearward thereof, the connecting duct 7 may be moved together with the moving duct 3.

The stopper 15 is integrally formed with a guide portion 33. The guide portion 33 guides the hook arm 23 to be rotated and allows the restraining arm 27 to be released from the restraining hole 31 and then allows the hook arm 23 to be locked to the stopper 15 as the locking lever 17 approaches to the stopper 15 with the restraining arm 27 inserted into the restraining hole 31.

That is, when the moving duct 3 is moved rearward from state shown in FIG. 11A or state shown in FIG. 12A, the hook arm 23 of the locking lever 17 is locked to the stopper 15 with state shown in FIG. 12C through state shown in FIG. 12B immediately before state shown in FIG. 11B. During the change from state shown in FIG. 12B to state shown in FIG. 12C, the hook arm 23 is moved rearward and is brought into contact with the guide portion 33 of the stopper 15, being rotated counterclockwise by guidance of the guide portion 33. Accordingly, the elastic force of the locking spring 19 is continuously applied to the locking lever 17, so that the hook arm 23 is rotated clockwise again to form the locked state as shown in state shown in FIG. 12C.

As an example, state shown in FIG. 12C remains the same even when the moving duct 3 is rearward than the reference state as in state shown in FIG. 11C.

In the housing 1 of the console, the storage box 13 is provided above the straight section of the moving duct 3 configured to overlap with the connecting duct 7; the moving duct 3 is fixed to the storage box 13; the shaft of the locking lever 17 is fixed to a lower moving block 35 integrally formed at a lower side of the connecting duct 7; and the locking release portion 21 is integrally provided with the lower plate 29 fixed to the lower side of the moving duct 3.

A straight guide 37 is provided on an upper side of the connecting duct 7 to guide the relative linear sliding of the connecting duct 7 and the storage box 13.

An upper moving block 39 is provided above the connecting duct 7 and coupled to an upper side of the lower moving block 35 and the straight guide 37 is provided between the upper moving block 39 and the storage box 13.

The connecting duct 7 is integrally formed while being covered by the upper moving block 39 at the upper side and the lower moving block 35 at the lower side thereof. The shaft of the locking lever 17 and the locking spring 19 are provided at a lower side of the lower moving block 35 and the straight guide 37 is provided between the upper moving block 39 and the storage box 13, so that the movement of the storage box 13 when the storage box 13 is moved with respect to the connecting duct 7 together with the moving duct 3 may be smoothly and stably guided.

In the moving console system, the movable console includes: a slider 41 fixed to a lower side of the lower plate 29; guide rails 43 fixed to the vehicle body to guide linear sliding of the slider 41 relative to the vehicle body; and a drive motor 45 configured to supply power for moving the slider 41 along the guide rails 43 so that the lower plate 29, the moving duct 3, and the housing 1 linearly slide.

In the moving console system, when the present invention is configured such that, when the drive motor 45 is operated by a separate operating switch, as the slider 41 linearly slides along the guide rails 43, the housing 1 and the moving duct 3 are moved and thus a position of the movable console may be varied relative to the vehicle body.

As an example, the configuration in which the slider 41 linearly slides by the rotational force of the drive motor 45 may be realized by conventional variable linear operating device such as a lead screw.

Figure 13:
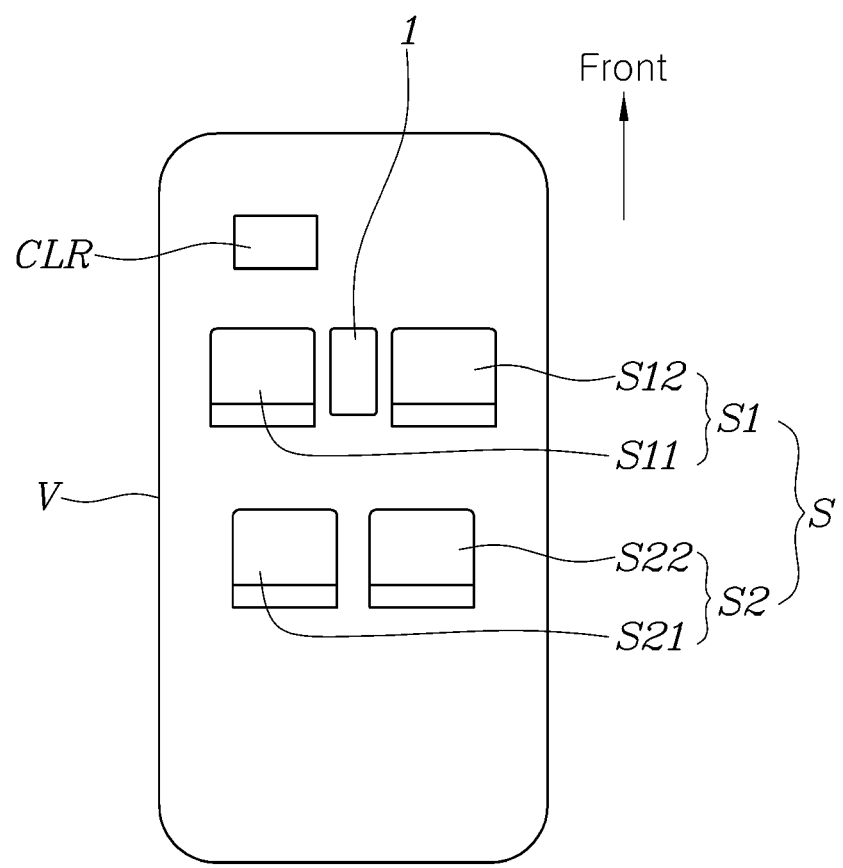
FIG. 13 is a view showing an example of a reference seat state to which a control method for a vehicle with the moving console system according to various exemplary embodiments of the present invention is applied.

FIG. 13 is a view showing seats S disposed in a reference seat state in a vehicle with the moving console system described above.

Toward the front of the vehicle body V, first row seats S1 and second row seats S2 are disposed in sequence from the front to the rear. The housing 1 of the console is disposed between the two first row seats S1, so that the arrangement is the same as seat and console arrangement of a conventional general passenger vehicle.

Furthermore, the housing 1 of the console is in the reference state in the reference seat state, so that the connecting duct 7 is fixed to the stopper 15 and the straight section of the moving duct 3 maximally overlaps with the connecting duct 7, as shown in FIG. 11B. Therefore, hot or cool air supplied through the fixed duct 5 may be discharged to the front of the second row seats S2 through the connecting duct 7 and the moving duct 3.

The vehicle may separately have a controller (CLR) configured for controlling the behavior of the seats S and the moving console system as shown in the drawings. The CLR may be configured to receive a command to start a function to change seats to a face-to-face seat state or a command to start an entering or exiting support function by various human machine interface (HMI) means such as input switch manipulation, voice commands, gesture commands of a user, etc. to realize the functions.

Figure 14:
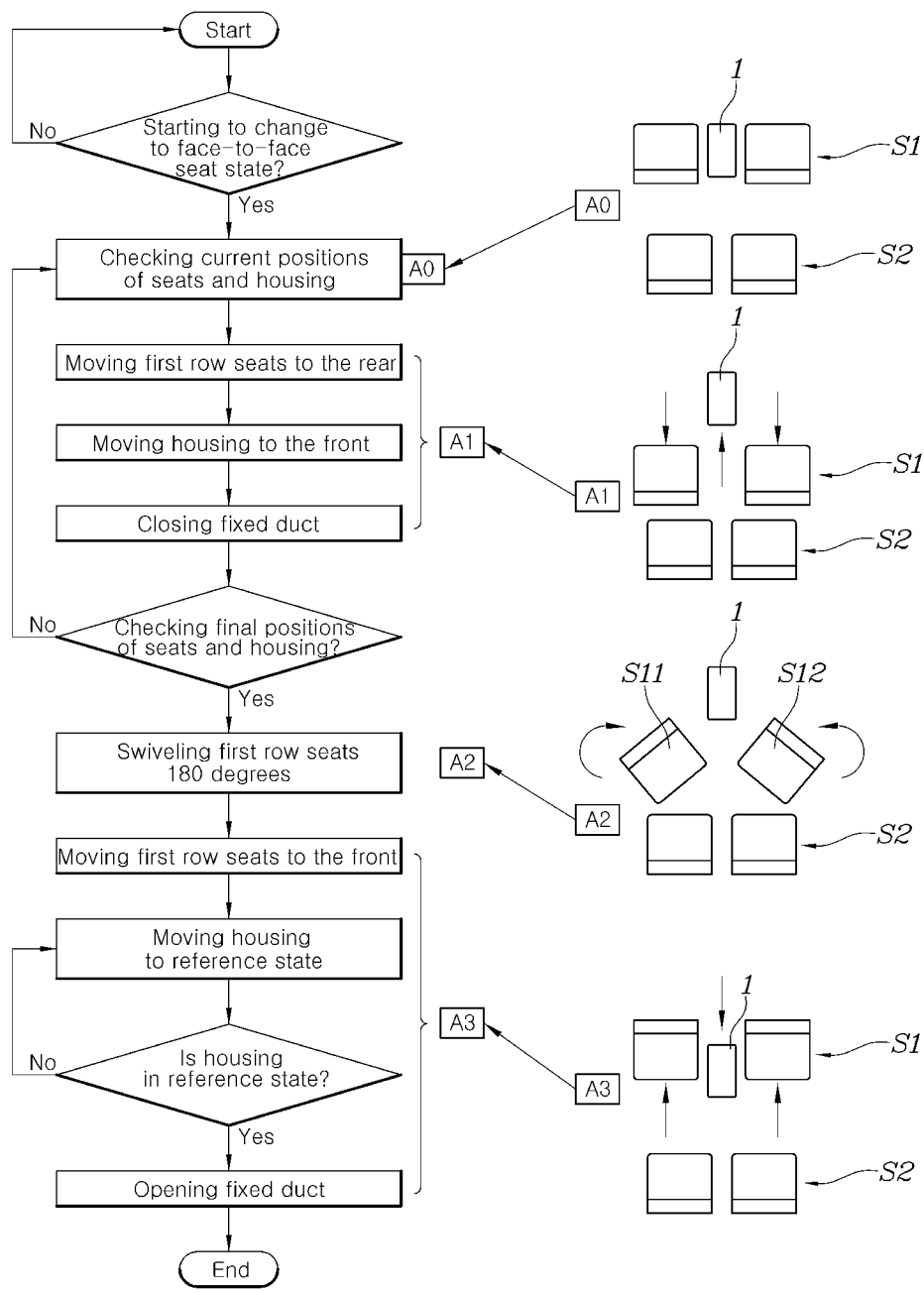
FIG. 14 is a view showing various exemplary embodiments of the control method for the vehicle with the moving console system according to various exemplary embodiments of the present invention.

Referring to FIG. 14, a control method for the vehicle with the moving console system according to various exemplary embodiments of the present invention is shown. When the function to change the reference seat state to the face-to-face seat state is started, the control method includes: (A1) disengaging the first row seats S1 and the housing 1 of the console from each other in a longitudinal direction of the vehicle body V; (A2) swiveling the first row seats S1 to face the second row seats S2; and (A3) performing at least one of moving the first row seats S1 to the front of the vehicle body V and moving the housing 1 to the rear of the vehicle body V.

As an example, in FIG. 14, the reference seat state is shown as A0, and the movements of the seats and the housing performing in each control step are also shown in the drawing.

(A1), (A2), and (A3) realize the change of the seat state of the vehicle from the reference seat state in which the first and second row seats are disposed to allow passengers to face the front of the vehicle to the face-to-face seat state in which the first row seats are disposed to allow passengers in the first row seats to face the rear of the vehicle so that the passengers in the first row seats and passengers in the second row seats face to each other.

The function to change from the reference seat state to the face-to-face seat state may be started by separate switch operation input of a user. When the user inputs the switch operation, the CLR may determine that the change to the face-to-face seat state is started.

(A1) may be performed by moving the housing 1 to the front of the vehicle body V and moving the first row seats S1 to the rear of the vehicle body V.

The housing 1 of the console is moved to the front side of the vehicle body V from the reference state and the first row seats S1 are moved to the rear of the vehicle body V, so that a space is provided between the housing 1 and the first row seats S1. Accordingly, the space to enable the swiveling of the first row seats S1 may be secured.

After the swiveling is performed in performing (A2) so that the first row seats S1 face the second row seats S2, in (A3), the housing 1 is moved to the rear of the vehicle body V by a distance in which the housing 1 is moved forward in (A1), and the first row seats S1 are moved to the front of the vehicle body V by a distance in which the first row seats S1 are moved rearward in (A1).

Accordingly, the first row seats S1 and the second row seats S2 have sufficient front-to-rear clearance therebetween to secure space for the passengers to sit comfortably. The housing 1 is returned to the reference state and discharges hot or cool air supplied through the fixed duct 5 to the space in which the passengers in the first row seats S1 and the second row seats S2 face each other, so that indoor temperature control and air conditioning performance may be secured.

The housing 1 may be further moved rearward as shown in FIG. 11C, so that the hot or cool air may be discharged at further rear of the vehicle body V.

Meanwhile, (A1) is performed while the housing 1 is moved to the front of the vehicle body V, and thus (A3) may be performed while the housing 1 is moved rearward by the distance in which the housing 1 is moved forward in (A1).

Depending on the specifications of the vehicle, such as the forward movable distance of the housing 1, the space occupied when the seats are swiveled, the first row seats S1 may be swiveled even when only the housing 1 is moved to the front of the vehicle body V. Therefore, in the above case, only the housing 1 of the console is moved forward and then returned to the reference state.

To the same effect as the above reason, in (A1), the first row seats S1 may be moved to the rear of the vehicle body V, and in (A3), the first row seats S1 may be moved forward by the distance in which the first row seats S1 are moved rearward in (A1).

The above method may be used in a case in which there is not interference between the housing 1 of the console and the second row seats S2 when the first row seats S1 are moved rearward and swiveled.

When (A1) is performed, the fixed duct 5 of the moving console system is closed, and when (A3) is completed, the fixed duct 5 of the moving console system is opened.

When the housing 1 is moved forward from the reference state to be turned from state shown in FIG. 11B to state shown in FIG. 11A by performing (A1), the air discharged through the fixed duct 5 may not be supplied to the connecting duct 7 and the moving duct 3. At the instant time, the CLR controls a separate valve, etc. provided in the fixed duct 5 so that the fixed duct 5 is temporarily closed. When the housing 1 is returned to the reference state by performing (A3), the CLR opens the valve so that the air supplied through the fixed duct 5 may be discharged through the vent of the housing 1 by passing through the connecting duct 7 and the moving duct 3.

Figure 15:
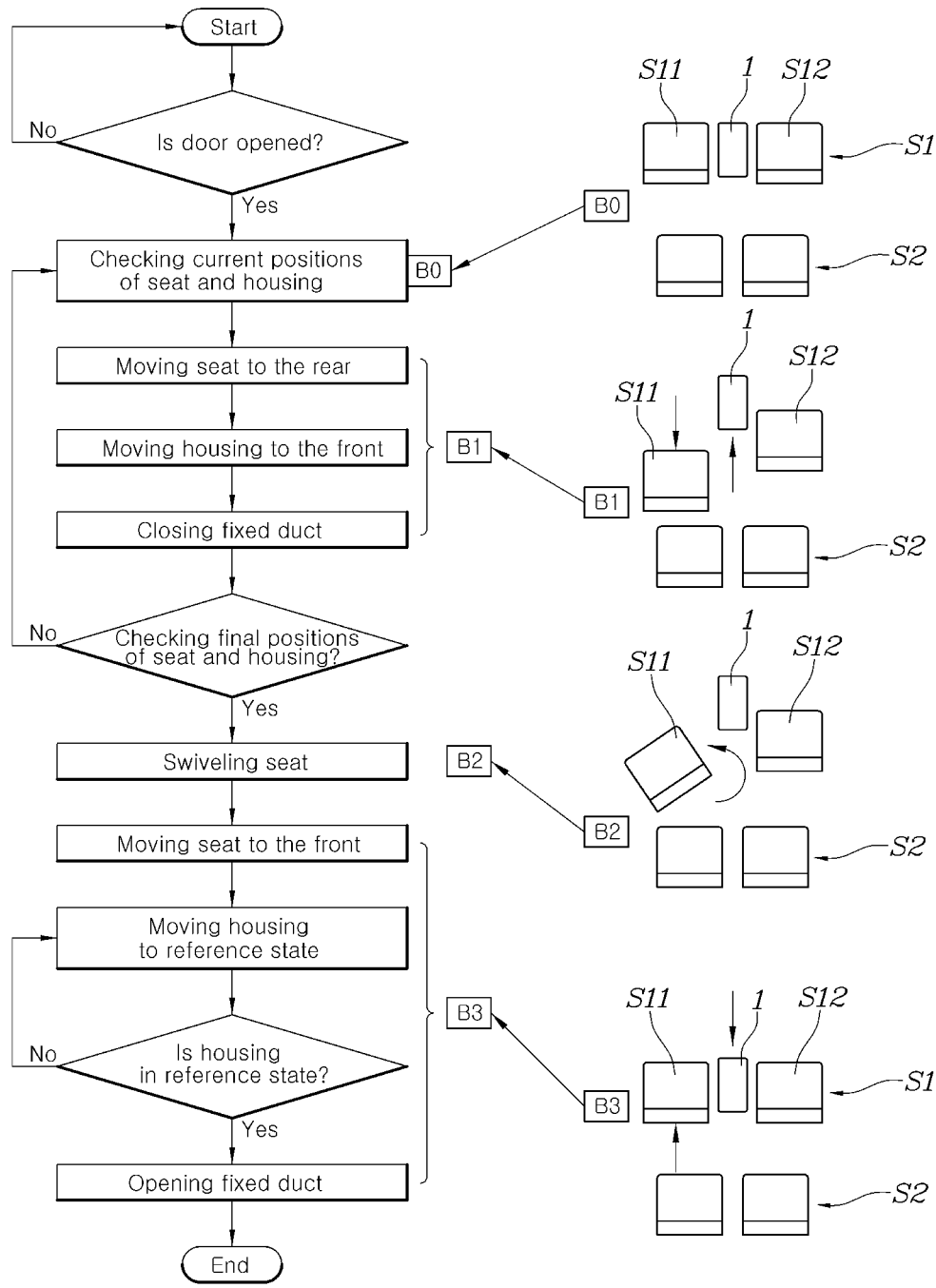
FIG. 15 is a view showing various exemplary embodiments of the control method for the vehicle with the moving console system according to various exemplary embodiments of the present invention.

Referring to FIG. 15, a control method for the vehicle with the moving console system according to various exemplary embodiments of the present invention is shown. When the entering or exiting support function is started, the control method includes: (B1) disengaging the first row seats S1 and the housing 1 of the console from each other in the longitudinal direction of the vehicle body V; (B2) swiveling a seat S11 to perform the entering or exiting support function in the first row seats S1 to be directed to the outside of the vehicle body V; and (B3) when the entering or exiting is completed, performing at least one of moving the first row seats S1 to the front of the vehicle body V and moving the housing 1 to the rear of the vehicle body V.

As an example, the reference seat state is shown as B0 in FIG. 15, and the movements of the seats and the housing performing in each control step are also shown in the drawing.

That is, (B1), (B2), and (B3) realize from the reference seat state in which passengers in first and second row seats face forward to operation and restoration for the entering or exiting support function to enable convenient entering or exiting when a passenger in a first row seat tries to enter or exit.

The start of the entering or exiting support function from the reference seat state may be performed by separate switch operation input of a user. When a door at a direction where the user wants to enter or exit is opened as shown in FIG. 15, the CLR may determine that the entering or exiting support function is started.

(B1) may be performed by moving the housing 1 to the front of the vehicle body V and by moving the first row seats S1 to the rear of the vehicle body V.

That is, the housing 1 of the console is moved to the front of the vehicle body V from the reference state and the first row seats S1 is moved to the rear of the vehicle body V, so that a space is provided between the housing 1 and the first row seats S1. Whereby, the space may be secured to enable the swiveling of the first row seats S1.

In the instant case, after the swiveling of the seat to perform the entering or exiting support function is completed so that the seat faces the outside of the vehicle body V by performing (B2), (B3) is performed by moving the housing 1 rearward by a distance in which the housing 1 is moved forward in (B1) and by moving the first row seats S1 forward by a distance in which the first row seats S1 is moved rearward in (B1).

When the housing 1 is moved forward and the first row seats S1 are moved rearward in (B1), (B2) may be performed rapidly and easily.

Alternately, the present invention may be configured such that, the housing 1 is moved to the front of the vehicle body V in (B1), and after (B2) is completed, the housing 1 is moved rearward in (B3) by a distance in which the housing 1 is moved forward in (B1).

As described above, the above method may be used in a case when space securing for the swiveling of the seat to perform the entering or exiting support function may be secured only by forward movement of the housing 1.

Furthermore, the present invention may be configured such that, the first row seats S1 are moved to the rear of the vehicle body V in (B1), and after (B2) is completed, the first row seats S1 are moved forward in (B3) by a distance in which the first row seats S1 are moved forward in (B1).

In the instant case, sufficient space between the first row seats S1 and the housing 1 is secured only by rearward movement of the first row seats S1, and the above method may be used in a case when the swiveling of the first row seats S1 is possible for performing the entering or exiting support function.

Meanwhile, the fixed duct 5 of the moving console system is closed in (B1), and after (B3) is completed, the fixed duct 5 of the moving console system may be opened.

When the housing 1 is moved forward from the reference state by performing (B1) to be turned from state shown in FIG. 11B to state shown in FIG. 11A, the air discharged through the fixed duct 5 may not be supplied to the connecting duct 7 and the moving duct 3. At the instant time, the CLR controls the valve separately provided in the fixed duct 5 so that the fixed duct 5 is temporarily closed. When the housing 1 is returned to the reference state by performing (B3), the CLR opens the valve so that the air supplied through the fixed duct 5 may be discharged through the vent of the housing 1 by passing through the connecting duct 7 and the moving duct 3.

Meanwhile, when (B1) is performed, all the first row seats S1 may be moved rearward thereof, but as shown in FIG. 15, among the first row seats S1, only the seat S11 to perform the entering or exiting support function may be moved to the rear of the vehicle body V. Furthermore, the housing 1 is moved to the front of the vehicle body V from the reference state, and then when (B3) is performed, the seat S11 that has performed the entering or exiting support function may be moved forward and the housing 1 may be returned to the reference state.

Meanwhile, in (B2), the seat S11 to perform the entering or exiting support function is swiveled to face the outside of the vehicle body V within a range of an acute angle from the front of the vehicle body V, so that the space for the swiveling of the seat S11 to perform the entering or exiting support function may be reduced. Accordingly, the present invention may secure an effect of reducing longitudinal movement distance of the housing 1 or the seat.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A control method for a vehicle with a moving console system having a movable console and a fixed duct, the control method comprising:
    when a function to change a reference seat state to a face-to-face seat state is started,
    disengaging first row seats and a housing of the movable console of the vehicle from each other in a longitudinal direction of a vehicle body in the vehicle;
    swiveling the first row seats to face second row seats of the vehicle; and
    performing at least one of moving the first row seats to a front of the vehicle body and moving the housing to a rear of the vehicle body,
    wherein the moving console system includes:
        a moving duct mounted in the housing and slidable with the housing;
        a connecting duct configured to slide relative to sliding of the moving duct and to supply air received from the fixed duct to the moving duct; and
        a locking device configured to lock or unlock the connecting duct at a position of the fixed duct where an entrance of the connecting duct fluidically communicates with the fixed duct,
    wherein the moving duct includes a straight section slidably coupled with the connecting duct while being fitted over a portion of the connecting duct, maintaining in fluidical communication with the connecting duct continuously while the moving duct slides in a direction away from the connecting duct, and
    wherein the locking device includes:
        a stopper fixed to the vehicle body;
        a locking lever rotatably fixed with respect to the connecting duct,
    wherein a locking state of the locking lever to the stopper is changed according to a rotation angle of the locking lever; and
    a locking spring configured to apply an elastic force to the locking lever in a direction in which the locking lever is locked to the stopper.

2. The control method of claim 1, wherein, in the disengaging the first row seats and the housing of the movable console of the vehicle from each other in the longitudinal direction of the vehicle body in the vehicle, the housing is moved to the front of the vehicle body, and the first row seats are moved to the rear of the vehicle body.

3. The control method of claim 2, wherein,
    in the performing the at least one of moving the first row seats to the front of the vehicle body and moving the housing to the rear of the vehicle body, the housing is moved to the rear of the vehicle body by a distance in which the housing is moved forward in the disengaging the first row seats and the housing of the movable console of the vehicle from each other in the longitudinal direction of the vehicle body in the vehicle; and
    the first row seats are moved to the front of the vehicle body by a distance in which the first row seats are moved rearward in the disengaging the first row seats and the housing of the movable console of the vehicle from each other in the longitudinal direction of the vehicle body in the vehicle.

4. The control method of claim 1, wherein,
    in the disengaging the first row seats and the housing of the movable console of the vehicle from each other in the longitudinal direction of the vehicle body in the vehicle, the housing is moved to the front of the vehicle body, and
    in the performing the at least one of moving the first row seats to the front of the vehicle body and moving the housing to the rear of the vehicle body, the housing is moved to the rear of the vehicle body by a distance in which the housing is moved forward in the disengaging the first row seats and the housing of the movable console of the vehicle from each other in the longitudinal direction of the vehicle body in the vehicle.

5. The control method of claim 1, wherein,
    in the disengaging the first row seats and the housing of the movable console of the vehicle from each other in the longitudinal direction of the vehicle body in the vehicle, the first row seats are moved to the rear of the vehicle body, and
    in the performing the at least one of moving the first row seats to the front of the vehicle body and moving the housing to the rear of the vehicle body, the first row seats are moved to the front of the vehicle body by a distance in which the first row seats are moved rearward in the disengaging the first row seats and the housing of the movable console of the vehicle from each other in the longitudinal direction of the vehicle body in the vehicle.

6. The control method of claim 1, wherein,
    when the disengaging the first row seats and the housing of the movable console of the vehicle from each other in the longitudinal direction of the vehicle body in the vehicle is performed, the fixed duct in the moving console system is closed; and
    when the performing the at least one of moving the first row seats to the front of the vehicle body and moving the housing to the rear of the vehicle body is completed, the fixed duct in the moving console system is opened.

7. The control method of claim 1, wherein,
when the disengaging the first row seats and the housing of the movable console of the vehicle from each other in the longitudinal direction of the vehicle body in the vehicle is performed, the housing is moved relatively forward from a reference state on the vehicle body; and
when the performing the at least one of moving the first row seats to the front of the vehicle body and moving the housing to the rear of the vehicle body is performed, the housing is returned to the reference state.

8. The control method of claim 1, wherein the moving console system further includes a controller having:
a processor; and
a non-transitory storage medium on which a program for performing the control method of claim 1 is recorded and executed by the processor.

9. A non-transitory computer readable storage medium on which a program for performing the control method of claim 1 is recorded.

10. A control method for a vehicle with a moving console system having a movable console and a fixed duct, the control method comprising:
when an entering or exiting support function is started in a reference seat state,
disengaging first row seats and a housing of the movable console of the vehicle from each other in a longitudinal direction of a vehicle body in the vehicle;
swiveling a seat to perform the entering or exiting support function in the first row seats to be directed to an outside of the vehicle body; and
when the entering or exiting support function is completed, performing at least one of moving the first row seats to a front of the vehicle body and moving the housing to a rear of the vehicle body,
wherein the moving console system includes:
a moving duct mounted in the housing and slidable with the housing;
a connecting duct configured to slide relative to sliding of the moving duct and to supply air received from the fixed duct to the moving duct; and
a locking device configured to lock or unlock the connecting duct at a position of the fixed duct where an entrance of the connecting duct fluidically communicates with the fixed duct,
wherein the moving duct includes a straight section slidably coupled with the connecting duct while being fitted over a portion of the connecting duct, maintaining in fluidical communication with the connecting duct continuously while the moving duct slides in a direction away from the connecting duct, and
wherein the locking device includes:
a stopper fixed to the vehicle body;
a locking lever rotatably fixed with respect to the connecting duct, wherein a locking state of the locking lever to the stopper is changed according to a rotation angle of the locking lever; and
a locking spring configured to apply an elastic force to the locking lever in a direction in which the locking lever is locked to the stopper.

11. The control method of claim 10, wherein, in the disengaging the first row seats and the housing of the movable console of the vehicle from each other in the longitudinal direction of the vehicle body in the vehicle, the housing is moved to the front of the vehicle body, and the first row seats are moved to the rear of the vehicle body.

12. The control method of claim 11, wherein,
in the performing the at least one of moving the first row seats to the front of the vehicle body and moving the housing to the rear of the vehicle body, the housing is moved to the rear of the vehicle body by a distance in which the housing is moved forward in the disengaging the first row seats and the housing of the movable console of the vehicle from each other in the longitudinal direction of the vehicle body in the vehicle; and
the first row seats are moved to the front of the vehicle body by a distance in which the first row seats are moved rearward in the disengaging the first row seats and the housing of the movable console of the vehicle from each other in the longitudinal direction of the vehicle body in the vehicle.

13. The control method of claim 10, wherein,
in the disengaging the first row seats and the housing of the movable console of the vehicle from each other in the longitudinal direction of the vehicle body in the vehicle, the housing is moved to the front of the vehicle body, and
in the performing the at least one of moving the first row seats to the front of the vehicle body and moving the housing to the rear of the vehicle body, the housing is moved to the rear of the vehicle body by a distance in which the housing is moved forward in the disengaging the first row seats and the housing of the movable console of the vehicle from each other in the longitudinal direction of the vehicle body in the vehicle.

14. The control method of claim 10, wherein,
in the disengaging the first row seats and the housing of the movable console of the vehicle from each other in the longitudinal direction of the vehicle body in the vehicle, the first row seats are moved to the rear of the vehicle body, and
in the performing the at least one of moving the first row seats to the front of the vehicle body and moving the housing to the rear of the vehicle body, the first row seats are moved to the front of the vehicle body by a distance in which the first row seats are moved rearward in the disengaging the first row seats and the housing of the movable console of the vehicle from each other in the longitudinal direction of the vehicle body in the vehicle.

15. The control method of claim 10, wherein,
when the disengaging the first row seats and the housing of the movable console of the vehicle from each other in the longitudinal direction of the vehicle body in the vehicle is performed, the fixed duct in the moving console system is closed; and
when the performing the at least one of moving the first row seats to the front of the vehicle body and moving the housing to the rear of the vehicle body is completed, the fixed duct in the moving console system is opened.

16. The control method of claim 10, wherein,
when the disengaging the first row seats and the housing of the movable console of the vehicle from each other in the longitudinal direction of the vehicle body in the vehicle is performed, the housing is moved relatively forward from a reference state on the vehicle body; and
when the performing the at least one of moving the first row seats to the front of the vehicle body and moving the housing to the rear of the vehicle body is performed, the housing is returned to the reference state.

17. The control method of claim 10, wherein,
when the disengaging the first row seats and the housing of the movable console of the vehicle from each other in the longitudinal direction of the vehicle body in the vehicle is performed, the seat to perform the entering or exiting support function in the first row seats is moved to the rear of the vehicle body and the housing is moved relatively forward from a reference state on the vehicle body; and when the performing the at least one of moving the first row seats to the front of the vehicle body and moving the housing to the rear of the vehicle body is performed, the seat to perform the entering or exiting support function is moved forward and the housing is returned to the reference state.

18. The control method of claim 10, wherein, in the swiveling the seat to perform the entering or exiting support function in the first row seats to be directed to the outside of the vehicle body, the seat to perform the entering or exiting support function is swiveled toward the outside of the vehicle body within a range of an acute angle from the front of the vehicle body.

19. The control method of claim 10, wherein the moving console system further includes a controller having:
- a processor; and
- a non-transitory storage medium on which a program for performing the control method of claim 10 is recorded and executed by the processor.

20. A non-transitory computer readable storage medium on which a program for performing the control method of claim 10 is recorded.

* * * * *